(12) United States Patent
Dedhia et al.

(10) Patent No.: US 6,920,459 B2
(45) Date of Patent: Jul. 19, 2005

(54) SYSTEM AND METHOD FOR CONTEXT BASED SEARCHING OF ELECTRONIC CATALOG DATABASE, AIDED WITH GRAPHICAL FEEDBACK TO THE USER

(75) Inventors: Aatish Dedhia, Mumbai (IN); Sulur Duraiswamy Parthhiban, Mumbai (IN); Sunil Singhania, Mumbai (IN); Mahesh Labhe, Mumbai (IN); Avik Sarkar, Mumbai (IN)

(73) Assignee: Zycus Infotech PVT Ltd., Mumbai (IN)

( * ) Notice: Subject to any disclaimer, the term of this patent is extended or adjusted under 35 U.S.C. 154(b) by 360 days.

(21) Appl. No.: 10/151,303

(22) Filed: May 21, 2002

(65) Prior Publication Data

US 2003/0212669 A1 Nov. 13, 2003

(30) Foreign Application Priority Data

May 7, 2002 (IN) .................................. 415/MUM/2002

(51) Int. Cl.[7] .............................................. G06F 17/30
(52) U.S. Cl. ..................................................... 707/102
(58) Field of Search ......................................... 707/102

(56) References Cited

U.S. PATENT DOCUMENTS

| | | | | |
|---|---|---|---|---|
| 5,875,446 A | * | 2/1999 | Brown et al. .................. | 707/3 |
| 5,963,940 A | * | 10/1999 | Liddy et al. .................... | 707/5 |
| 6,012,053 A | | 1/2000 | Pant et al. | |
| 6,092,064 A | * | 7/2000 | Aggarwal et al. .............. | 707/6 |
| 6,269,368 B1 | * | 7/2001 | Diamond ........................ | 707/6 |
| 6,275,229 B1 | | 8/2001 | Weiner et al. | |
| 6,324,534 B1 | | 11/2001 | Neal et al. | |
| 6,326,962 B1 | | 12/2001 | Szabo | |
| 6,363,377 B1 | * | 3/2002 | Kravets et al. ................. | 707/4 |
| 2002/0183965 A1 | * | 12/2002 | Gogolak ....................... | 702/179 |
| 2003/0014399 A1 | * | 1/2003 | Hansen et al. .................. | 707/3 |
| 2004/0006566 A1 | * | 1/2004 | Taylor et al. ................ | 707/100 |

* cited by examiner

*Primary Examiner*—Wayne Amsbury
(74) *Attorney, Agent, or Firm*—Sidley Austin Brown & Wood LLP

(57) ABSTRACT

A method and system for context based searching of category wise arranged electronic catalog database is provided. The confidence value for each of the retrieved categories is displayed graphically as an indication of the relevance of that category. The percentage impact of each of the query terms on the search result is also shown in a graphical format. Various search strategies and algorithms are used and the output is ranked according to the user relevance. The system is intelligent in the sense that it suggests user with spellings, uses word morphing, synonymous words to user query etc. The user can define weightage to be given to various attributes and also refine his search by searching in particular segments.

28 Claims, 9 Drawing Sheets

SYSTEM AND METHOD FOR CONTEXT BASED SEARCHING OF ELECTRONIC CATALOG DATABASE, AIDED WITH GRAPHICAL FEEDBACK TO THE USER

The present invention relates to the field for search and retrieval of electronic catalogs. More particularly the invention relates to the user-interface provided for searching the electronic catalog and the subsequent display of the result.

BACKGROUND OF THE INVENTION

With the rapid spread of Internet, that has being growing exponentially since the last two decades every part of human life and the activities surrounding it are now done through the Internet. Similar is the case for business. Previously while buying and selling of items people used to browse through huge paperback catalogs containing thousands of records and then take a decision. In order to search for a product of interest the person concerned has to first find out from the index or content page, the probable topics/categories in which product with that description might occur. Then he has to browse through each of the entries of that page to find the product of his need. He has to repeat the procedure for new topics if he gets no satisfactory results.

For the ease of the user to search through catalogs more and more companies are reverting to electronic catalogs. The user can search through the catalogs quickly and hence place an order for the product immediately. This saves lot of time and money.

But then our claim of searching through the catalogs efficiently and quickly, this is not 100% correct. Because there may be thousands of categories in the whole category hierarchy and each having catalogs of varying types, quality and manufacturer amounting to total of more than millions of catalogs or data items. Out of all these the user is interested in a very few specific records. And generally the only interface provided to the user is that of the 'keyword search'. In this type of search the user types in certain keywords about the catalogs/categories or one that describes the product. And based on these few keywords the system ought to return to the user the most relevant catalogs/categories or data items of the user's interest. In this type of search it is a very difficult task for the system to retrieve only those items that are very specific to the user's interest.

Often the user is not quite sure of what his/her needs are. So in that case the user first types in certain keywords, gets an initial idea of the catalogs and then wishes to type in certain keywords more specific to the catalog of his/her need. But then the user wishes only to search for records within the chosen results of the first search. This feature is supported in many of the existing search engines by the name of 'Search within Results'.

Most of the present day available keyword search engines follow very simple methodology of searching through the contents of the available records and retrieving those products whose description terms that matches that of the query terms. Let us consider the example where the user is looking for a pen and the product description just describes the color and the quality of the pen but nowhere does it tell that the description is that of a pen. In such cases most present day keyword search engines fail to deliver the correct output to the user. Instead in such a scenario the user would ideally like to have something that conceptualizes the query terms and extracts the context out of the same. And hence match this extracted context with the context of the products already available in the database.

Also a retrieval or search system is used by both advanced users and by novice users. Users can have technical or non-technical background in the search field. People designing such a system are obviously very technically sound, but people hardly pay any attention as to how much comfortable it is for the end user. Not always does one find an intuitive interface.

One major problem that strikes most keyword search system is that the keywords match with more than one relevant category, so the system ought to return to the user the results for each of these categories. When showing more than one category where each of them are relevant to the keywords entered to some extent, the user will be confused with so many results and the system needs to specify the importance of each of the categories with respect to the input keywords of the query. In other words the system needs to rank the categories according to some measure of relevance, but among the present available retrieval engines none of them does that in a very accurate manner.

The user enters keywords to get to a certain catalog product. Usually the keyword contains name or description of the catalog item and/or some properties of the product like its dimension or color or some other attribute value of the desired product. The attributes of one product can match the attribute value of another product, like color and dimensions of different products can be same. And based on these keywords entered the user gets the response. All the present day search engines available show either the impact of each of the terms in the document or category level. None of them provides an impact value for the keywords on the overall search procedure, something that will aid the end user to get an overall understanding of the terms in the corpus.

There are a variety of the same products available and each of which is described by a different catalog or data item, hence we may have the same catalog with many varying dimensions and many varying colors. In such a case the user have to browse through many different types of the same item before he/she can go on to the next item. All the present day search/retrieval systems available present to the end user all the catalogs of data items that have being retrieved by the system, without paying any heed to the user's viewpoint. Hence due to this the user has to spend a lot of time browsing through useless items before he/she can reach to the catalog or item of exact need. The user has to repeatedly browse through similar products by pressing the 'NEXT' button on the browser.

A major problem that is faced in the present day search engines is that extracted attributes cannot be readily used by the system.

In the present search engines, the user enters certain terms in the query. All the query terms are given equal weightage by the system when retrieving the relevant categories or the catalogs within it.

Generally the present systems available are not smart enough to look for different tenses and different forms of the keywords entered.

While searching electronic catalogs using 'Keyword Search' or by navigating among the categories or perform a parametric search where product classes have parameters, the user faces the limitation of the relevant data required usually not present amongst the initial matches found, variety of products with same keyword or product description are found. Also there is no graphical interface for the user to easily understand the impact of each word in a multiple keyword search.

The search engines are made to be used by users with varying degree of skill. But the problem is that they are not designed so as to facilitate an advanced, technical user as well as a novice. Also the keywords and the attributes of the products are given equal weightage by the system. This is a limitation in the sense that it restricts the user to look for a product more closer to his needs.

Significant amount of work has taken place in the last few years in the area of providing user friendly search engines for electronic catalogs in various forms and this is reflected in the existing web sites as well as the patents that exist in this field.

U.S. Pat. No. 6,012,053 provides for a computer system for performing searches on a collection of information includes a mechanism through which results from a search query are ranked according to user specified relevance factors to allow the user to control how the search results are presented. The relevance factors are applied to the results achieved for each query. That is, each item returned by the search has a set of attributes. Each of these attributes is assigned a weight according to the specified relevance factors. These weights are combined to provide a score for the item. Search results are provided to the user, ordered according to scores. But the invention has the limitation that the output provided is not in a very user-friendly manner. The user has to browse through the whole textual list in order to see the results of his search.

In U.S. Pat. No. 6,275,229 a method and apparatus for efficiently analyzing information on a computer is provided. The information contains information items where each information item has a plurality of attributes. The information is re-organized based on the attributes and displayed in graphical form on a computer display screen. By viewing the information in graphical form, a user can quickly analyze the information to determine trends or qualities and also allows the user to quickly identify the information items most relevant to specific criteria. Here the user can not assign weightage to the specific attributes in order to refine the search.

In U.S. Pat. No. 6,326,962 an enhanced graphical user interface using Venn Diagrams to take the input query from the user is defined. But it does not define any user-friendly manner to display the output.

U.S. Pat. No. 6,324,534 describes an electronic catalog search engine utilizing many search strategies. It also groups the products and allows the user to refine the search based on product attributes.

The disadvantage with the systems described above is that they are not very accurate and even if they hit upon the result the display to the user is not is in a format that is easily understandable by him.

Also the user is not given much functionality and flexibility while defining his search query and performing subsequent searches based on the results of his primary query.

The present systems are restrictive in the sense that they are centered towards 'keyword based' search strategy rather than a 'context based' search strategy.

OBJECTS AND SUMMARY OF THE INVENTION

To overcome the above drawbacks the invention provides for a method and system for searching electronic catalog database that is aided with a graphical feedback to the user, in order for his easy understanding of the result.

The second object of the invention is to provide the user flexibility in defining the search criteria through various means like assigning weightage to the keywords given for search, searching subsets of search results, etc.

It is yet another object of the invention to aid the user in his search by using a combination of search strategies like morphology of words, suggesting user with spellings, soundex search, stemming etc.

The above objectives are achieved by providing an enhanced method and a system for searching of electronic catalogs. The enhanced search is a context-based search rather than the conventional keyword based search. This means that the system retrieves catalogs not just on the terms present in the product catalog, but instead extracts the concept or context of the catalogs and hence uses these context values to return the search results.

This search uses an advanced graphical user interface for input and output. In this search, the user is provided with the result of his search in a graphical format. The graphical output shows the effect of each user given keyword on the search result and also the relevance of the retrieved records. Obviously, the user is provided with a listing of records matching his search criteria The user can further refine his search by searching within the results or by assigning weightage to the query terms.

The system aids the search by clubbing multiple similar catalog descriptions into a single entry, suggesting users with spellings, and using various search strategies like morphology and soundex search.

The invention comprises of a database along with a search engine. The database may consist of an aggregate of supplier catalogs, ranked category wise. Each record further consists of product details and other related information as its parametric values.

The present invention uses one or more search strategies and algorithms like proximity searching, string matching, stemming, fuzzy logic, and soundex matching.

DETAILED DESCRIPTION OF THE DRAWINGS

Figure 1:
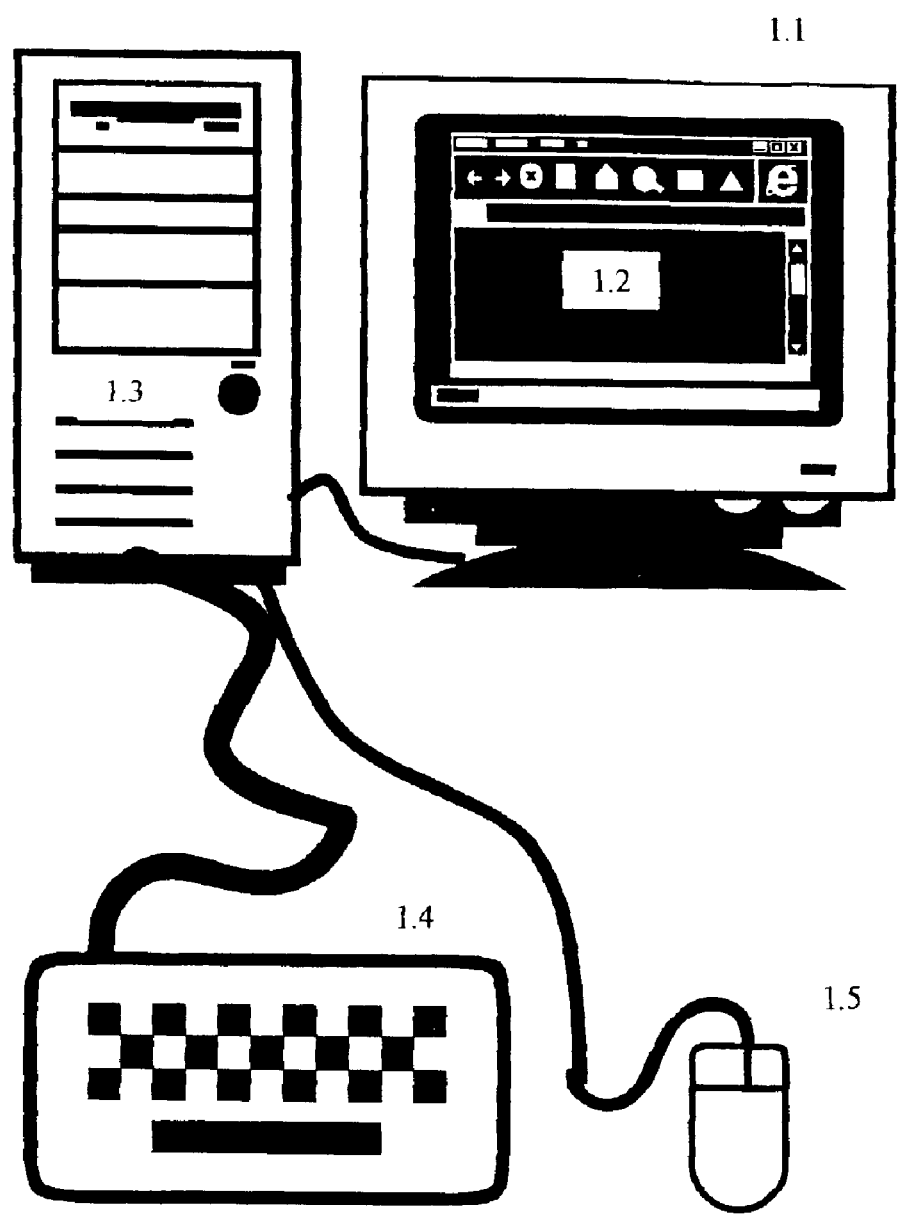
FIG. 1 shows a basic computer system on which the invention can be practiced.

FIG. 1 shows a basic computer system on which the invention might be practiced. The computer system comprises of a display device (1.1) with a display screen (1.2). Examples of display device are Cathode Ray Tube (CRT) devices, Liquid Crystal Display (LCD) Devices etc. The computer system can also have other additional output devices like a printer. The cabinet (1.3) houses the additional essential components of the computer system such as the microprocessor, memory and disk drives. In a general computer system the microprocessor is any commercially available processor of which x86 processors from Intel and 680X0 series from Motorola are examples. Many other microprocessors are available. The computer system could be a single processor system or may use two or more processors on a single system or over a network. The microprocessor for its functioning uses a volatile memory that is a random access memory such as dynamic random access memory (DRAM) or static memory (SRAM). The disk drives are the permanent storage medium used by the computer system. This permanent storage could be a magnetic disk, a flash memory and a tape. This storage could be removable like a floppy disk or permanent such as a hard disk. Besides this the cabinet (1.3) can also house other additional components like a Compact Disc Read Only Memory (CD-ROM) drive, sound card, video card etc. The computer system also has various input devices like a keyboard (1.4) and a mouse (1.5). The keyboard and the mouse are connected to the computer system through wired or wireless links. The mouse (1.5) could be a two-button mouse, three-button mouse or a scroll mouse. Besides the said input devices there could be other input devices like a light pen, a track ball etc. The microprocessor executes a program called the operating system for the basic functioning of the computer system. The examples of operating systems are UNIX, WINDOWS and DOS. These operating systems allocate the computer system resources to various programs and help the users to interact with the system. It should be understood that the invention is not limited to any particular hardware comprising the computer system or the software running on it.

Figure 2:
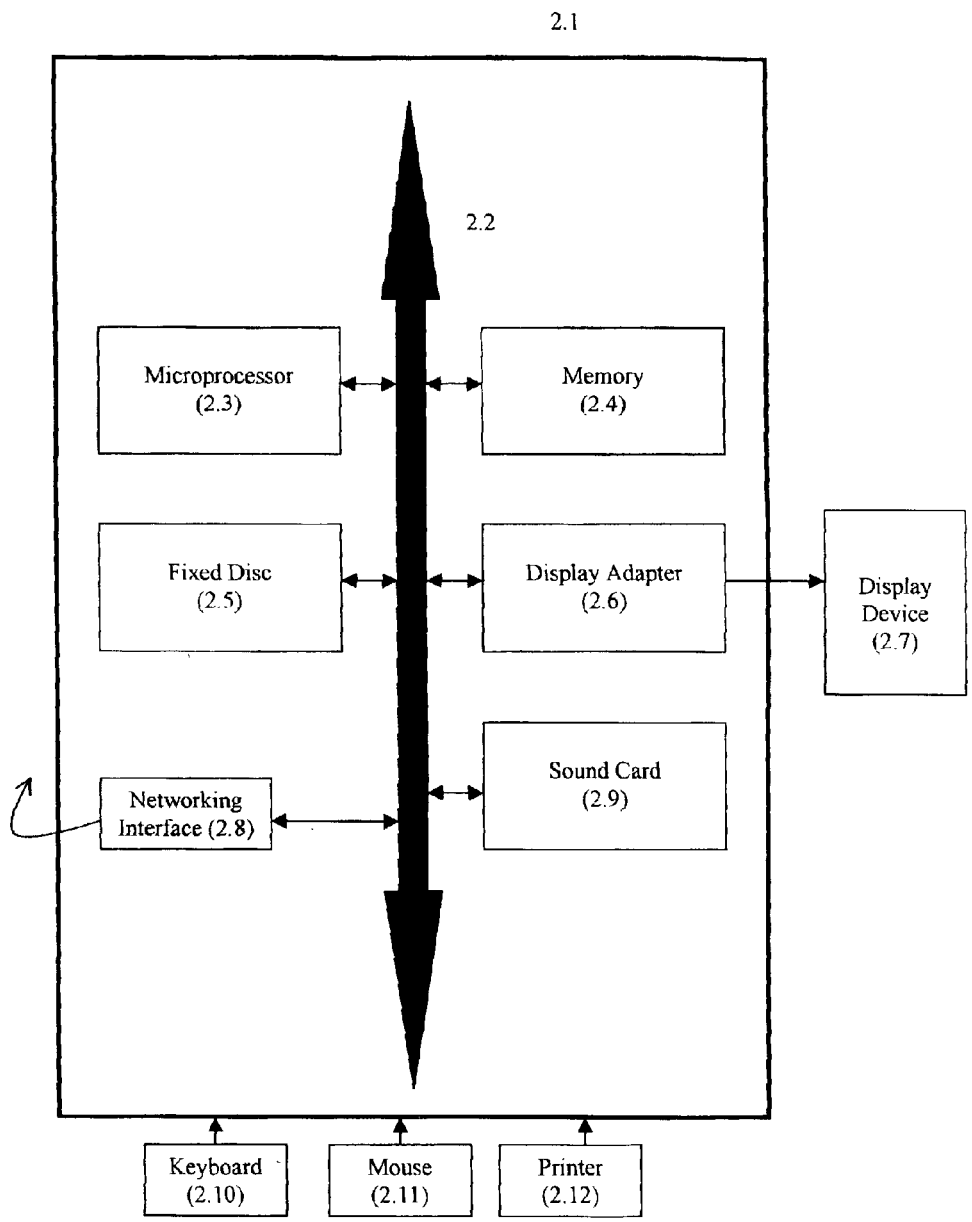
FIG. 2 shows the internal structure of the computer system of FIG. 1.

FIG. 2 shows the internal structure of the general computer system of FIG. 1. The computer system (2.1) consists of various subsystems interconnected with the help of a system bus (2.2). The microprocessor (2.3) communicates and controls the functioning of other subsystems. Memory (2.4) helps the microprocessor in its functioning by storing instructions and data during its execution. Fixed Drive (2.5) is used to hold the data and instructions permanent in nature like the operating system and other programs. Display adapter (2.6) is used as an interface between the system bus and the display device (2.7), which is generally a monitor. The network interface (2.8) is used to connect the computer with other computers on a network through wired or wireless means. The computer system might also contain a sound card (2.9). The system is connected to various input devices like keyboard (2.10) and mouse (2.11) and output devices like printer (2.12). Various configurations of these subsystems are possible. It should also be noted that a system implementing the present invention might use less or more number of the subsystems than described above.

Figure 3:
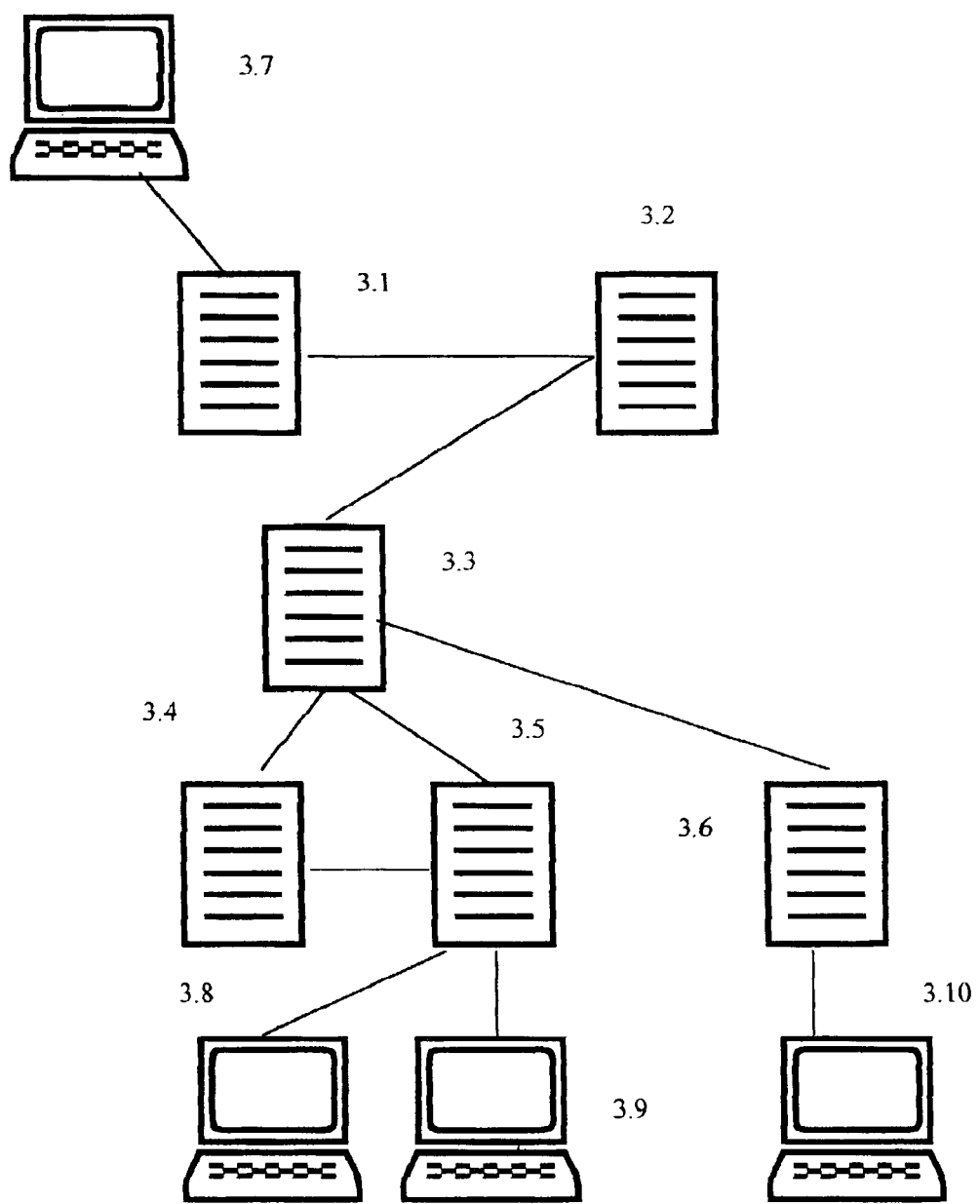
FIG. 3 shows a general computer network.

FIG. 3 shows a general computer network on which the invention might be practiced. It consists of a bunch of servers (3.1, 3.2, 3.3, 3.4, 3.5, 3.6) interconnected by any known communication means like by wired means, radio links or by infrared transmissions. The networking topology could be any known one in the art like star, linear, ring etc. or a combination of these. Further in order to communicate these servers could use any of the known communication protocols such as TCP/IP, ethernet etc. User workstations (3.7, 3.8, 3.9, 3.10) are connected to one or more servers for the retrieval of the data stored therein. Here too the interconnection could be through any means, topology and follow any protocol. Further the number of servers and the workstations is not limited and the data can reside either on one server or it could be distributed over a number of servers. Also some specific data can reside on the user workstations also.

Figure 4:
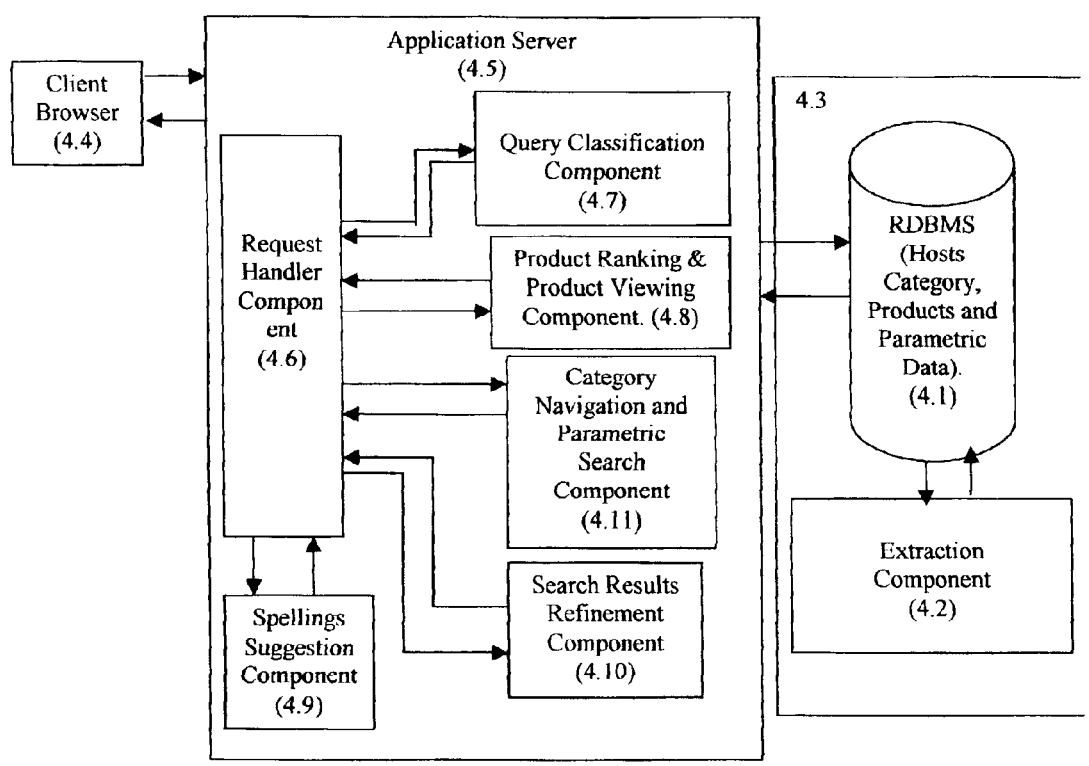
FIG. 4 is a block diagram of the present invention, highlighting the various components of the system.

FIG. 4 is the block diagram of the system showing its various components. The product catalogs are first uploaded into the database or relational database management system (RDBMS) (4.1) that resides on a database server (4.3). These product catalogs have information about the product description, the category into which it falls into, its supplier and related information as its parameter values. The extraction component (4.2) is used to extract the terms from each of the catalogs and hence computes the importance of each of the terms for a particular category and also for a particular catalog. This computed information is then written back to the RDBMS. These computed values are later used by the system to retrieve catalogs and their categories based on the context. The Client/User sends in the query terms through the Client Browser (4.4). The client browser resides on the user workstation that is connected to the Application Server (4.5), which in turn is connected to the database server. The Application Server does all the necessary calculations and the activities for displaying the results to the user or client.

The query terms first reaches the Request Handler Component (4.6), which sends the terms to the Query Classification Component (4.7). After classification, this component returns the category results back to Request Handler Component (4.6). These category results and the query terms are then sent to the Product Ranking and Product Viewing Component (4.8), which then returns the ranked relevant products to Request Handler Component (4.6). The results could be refined using the spellings suggestion component (4.9). Now if the user wishes to refine the search results, then this component sends in this request to the Search Result Refinement Component (4.10), which takes in the additional inputs and returns the results back to Request Handler Component (4.6). There is also a Category Navigation Component (4.11) that is used to browse through the complete category hierarchy and also view all the products in each of the categories.

Figure 5:
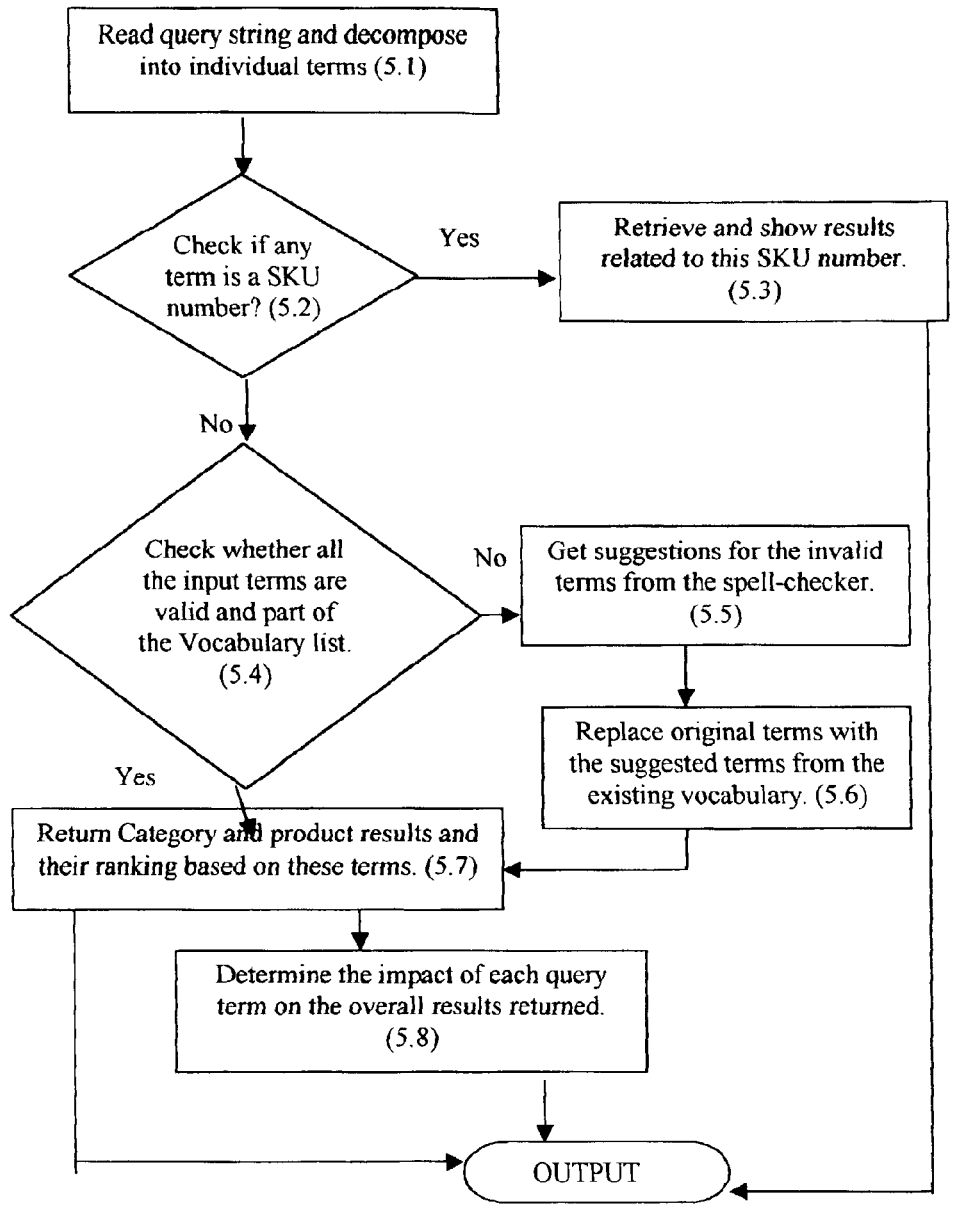
FIG. 5 is a flowchart depicting the working of the Query Classification Component.

FIG. 5 is the flowchart showing the working of the Query Classification Component (4.7). The Query Classification Component is responsible for returning the Category results based on the user's input query. First the query string is read and decomposed into the individual query terms. Then it is checked whether any of these query terms is a Stock Keeping Unit (SKU) number (5.2). SKU number is a unique number provided to a product by a particular supplier/manufacturer. Hence when the system searches for the SKU number it retrieves a product catalog unique to that supplier. The component also returns the category of that particular product along with its product description (5.3). After returning the results the system stops the processing for that particular query terms. But if none of the terms is a SKU number then the system checks whether each of the terms are a part of the existing vocabulary (5.4). If any of the terms are found not to be a part of the existing vocabulary, then correct suggestions for these terms are taken from the spell-checker (5.5). The next step involves replacing the non-vocabulary terms with the top most suggested terms by the spell-checking component (4.9) that are a part of the existing vocabulary (5.6). The spell-checking feature is achieved with the help of Spellings Suggestions Component (4.9) of FIG. 4. These terms whether the original ones or those corrected are used as input and then the top-most categories relevant to these query terms are returned (5.7). This step also involves calculating the ranking of the categories based on the pre-calculated importance values of each term for each of the categories. Another unique feature that this present invention provides is that it returns the impact of each of the query terms on the overall returned results (5.8). This step calculates the overall spread of each of the terms and also the spread of the terms along with their importance for the returned results. Based on these measures the impact of each of the query terms on the overall result is returned to the user.

Figure 6:
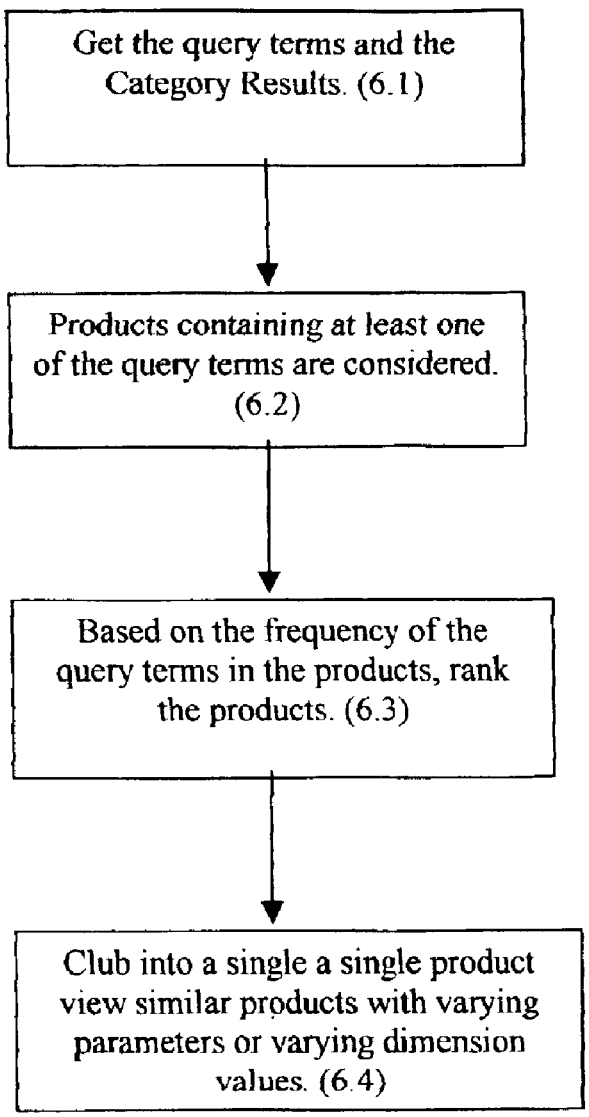
FIG. 6 is a flowchart showing the working of Product Ranking and Product Viewing Component.

FIG. 6 is the flowchart for the functioning of Product Ranking and Product viewing Component. This component handles the task of ranking the products with relevance to the user input query terms. This component takes in input the user query terms and the ranked categories and based on these ranks the products in these returned categories. The task of fetching the input from the external components is the first step (6.1). From the complete list of all the products for a particular category, only those that contain at least one of the query terms in any form are filtered and retained (6.2). Various form means that the system reduces all the terms in its vocabulary to the base morphological term by the aid of any external lexical dictionary. Also the system reduces each of the query terms to one in the exact morphological base form. Then all of the filtered relevant product catalog descriptions are ranked based on the frequency and importance of these terms with respect to its category (6.3). Usually there are many similar products, i.e. the same product with varying parameters and dimensions. And when all of these are shown to the user it becomes very tiresome and irritating for that person to go through all the similar products, before the user can switch onto the next product. The invention clubs all the similar products with varying dimensions (6.4). This step takes as input all the ranked relevant products of that category. It then finds for each of the products the other products similar to this one and hence returns only one unique product and returns the other in a list of similar products. The user may view all the similar products by a single click.

Figure 7:
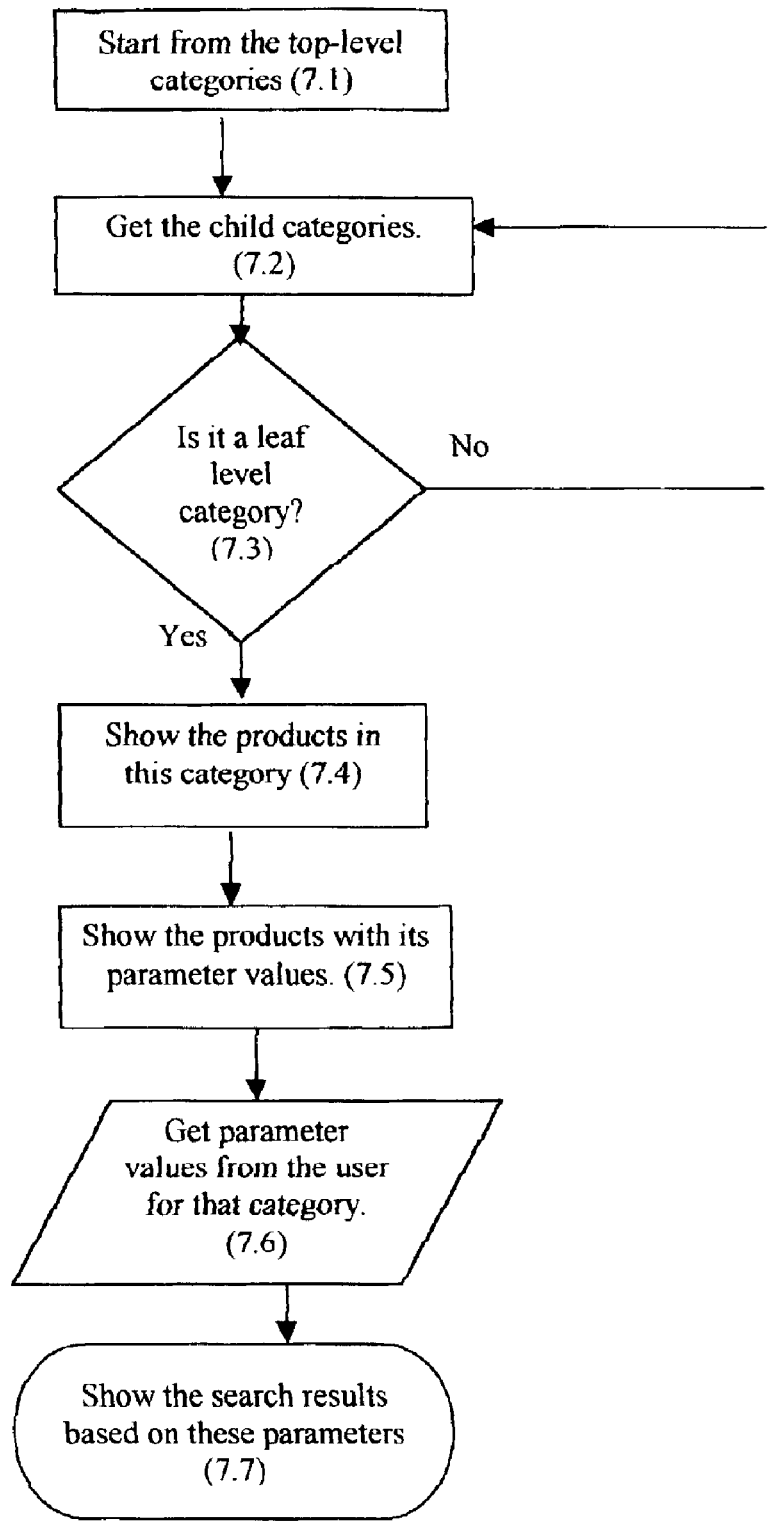
FIG. 7 is a flowchart for the working of Category Navigation and Parametric Search Component.

FIG. 7 is a flowchart for Category Navigation and Parametric Search Component. The process starts by navigating the tree from the top-most categories in the category hierarchy (7.1). Now for each of these categories, all its immediate child categories are retrieved (7.2). Then it is checked (7.3) whether any of the returned categories is a leaf level category. If the category under consideration is not a leaf level category then step 7.2 is repeated on retrieved child categories until a leaf level category is reached. If step 7.3 results in a leaf level category then all the product catalogs for that category are retrieved and shown to the user (7.4). On a further click of the mouse on any displayed product category, the next step takes place in which the selected products in the category are shown (7.5) in further details along with its price, long and short description and other parameter values that are made available in the database. An additional feature of parametric search is provided within each category. Once a category is fixed the parameters for this category is known. The user is offered to search based on these parameter values (7.6). The parameter values are already available when uploading the catalogs to the database. Now when the user selects the parameters based on which he/she wants to search, the component filters the products based on the parameter values and returns only those to the user that are relevant with that particular parameter values within that catalog. The parameters are taken as input in step 7.6 and output the results of the parametric search to the user (7.7).

Figure 8:
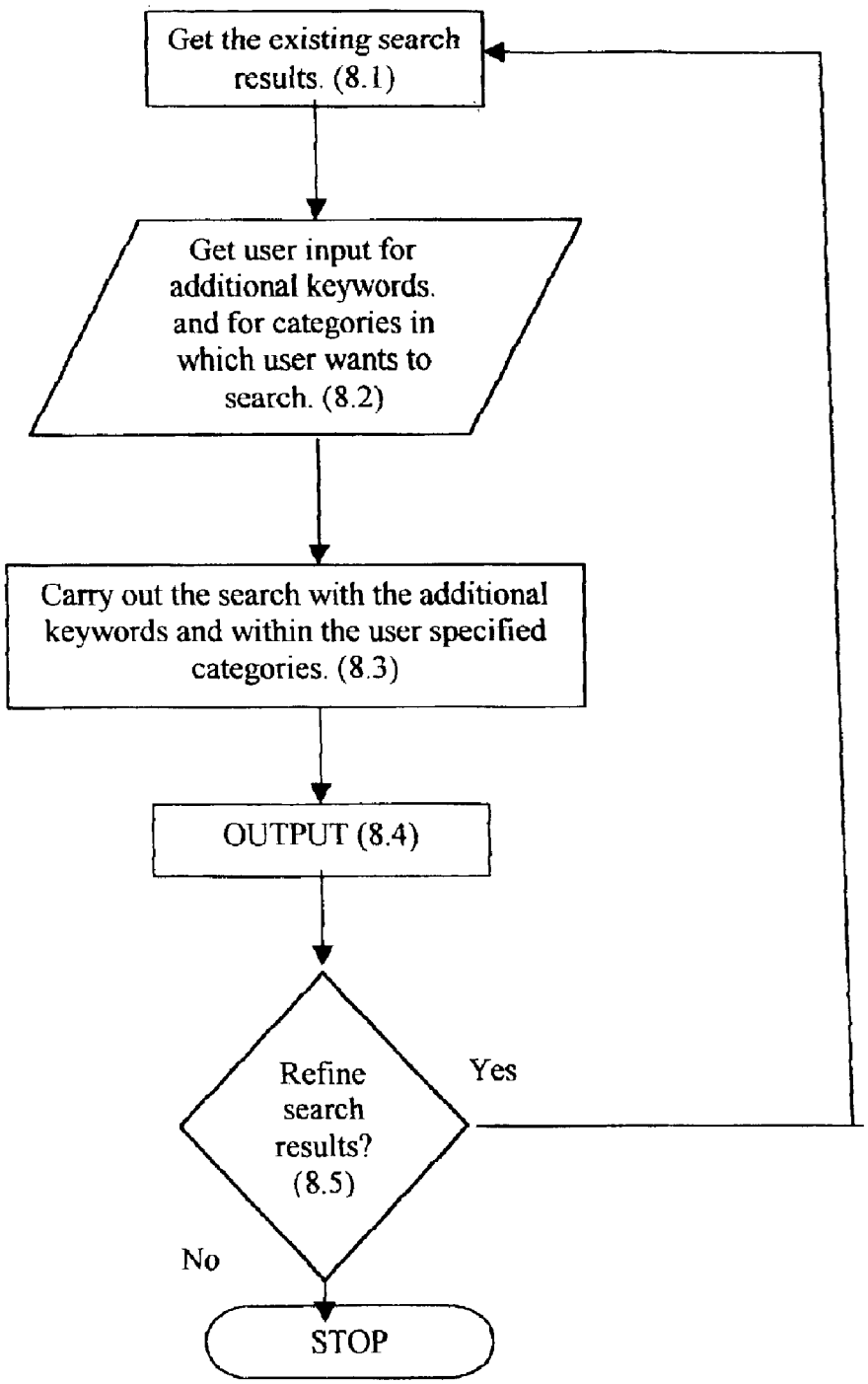
FIG. 8 is the flowchart for the Search Refinement Component.

FIG. 8 is the flowchart highlighting the functioning of the Search Refinement Component. In this feature the user is allowed to initiate a new search within the results of the existing search. Search Results Refinement Component provides this functionality. First this component gets the existing search results (8.1). Then it gets the additional query terms and also allows the user to choose some categories among those already returned by the initial search (8.2). These results are fetched by the system from the query classification component (4.7). Now based on these user inputs, the next step (8.3) involves initiating a new search with the specified keywords only in the specified categories and provide the output (8.4). The user is also prompted as to whether the user would further like to refine the search result (8.5). If so it initiates a new search within these results with another set of user inputs else the refinement stops.

Figure 9:
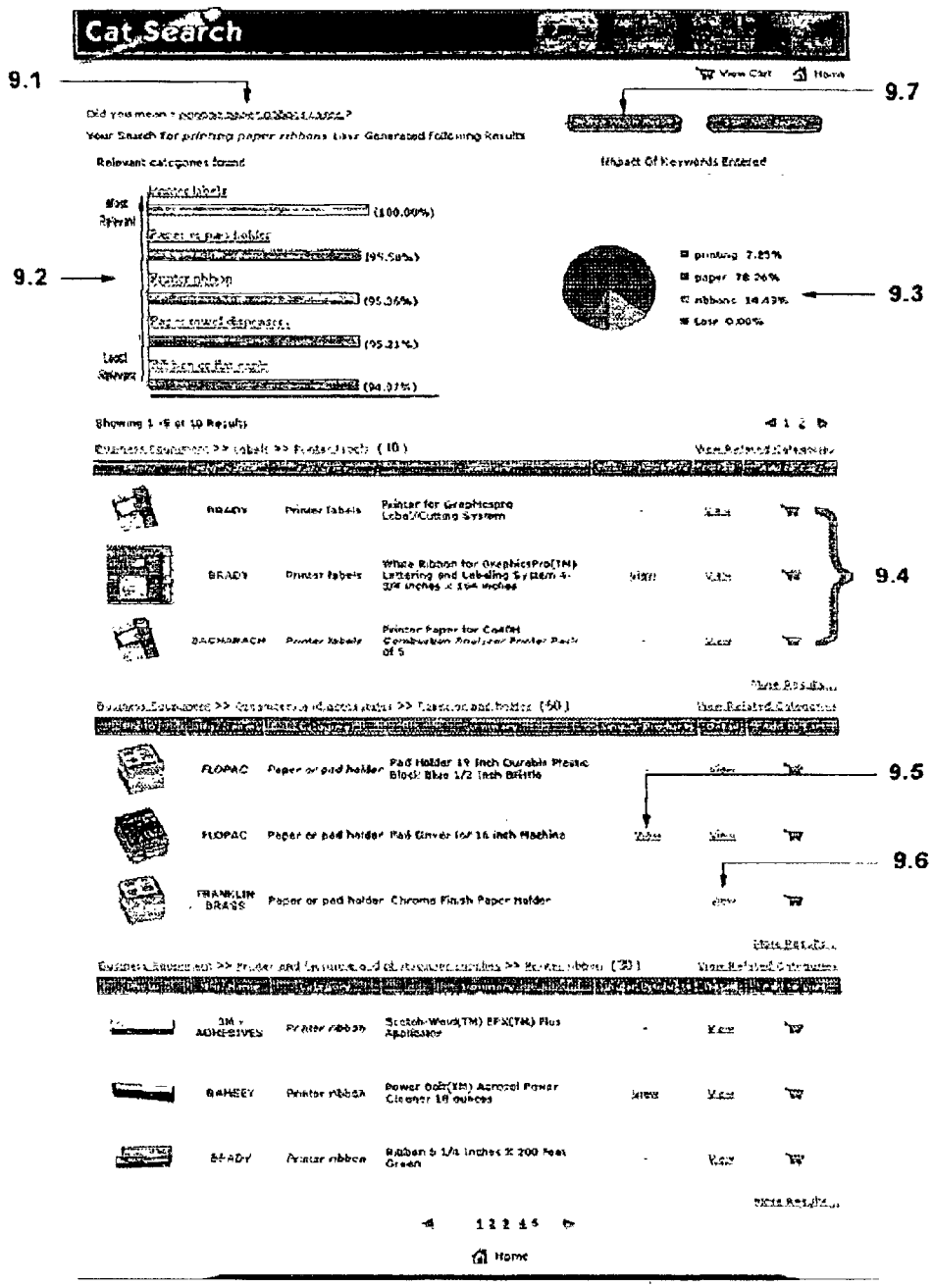
FIG. 9 is the graphical output as obtained from the system.

FIG. 9 shows the graphical output screen as obtained from the system. Here the screen shows the output for a certain query. The query in this case is that of "printing paper ribbons Lasr". 9.2 shows the ranked category result with respect to this particular query. 9.3 of this screen reveals the percentage impact of each of the query terms on the overall search results returned. It is interesting to note that the term Lasr was a misspell term, hence that term was not present in the vocabulary set of the existing catalogs in the database, due to this term has got zero percentage impact in the output. Also as 9.1 shows the suggestions for this misspell term from the Spellings Suggestion Component. Here it has suggested the term laser for the misspell term Lasr. 9.4 shows the ranked products of the first category. This is the output produced from Product Ranking & Product Viewing Component, which is responsible for ranking the product descriptions within each category. Along with the ranked products there are also some parameters provided for each product entry. 9.5 points to a position which when clicked, the user can view all the product catalogs that are similar to the one pointed and are clubbed into a single entry to reduce the redundancy in the display. 9.6 points to the position clicking on which the user will be able to view all the further details for that particular catalog like its dimensions, price, supplier details etc. 9.7 on top of the screen points to the position clicking on which the user can initiate a new search within the already returned results.

Having now described a few embodiments of the invention, it should be apparent to those skilled in the art that the foregoing is merely illustrative and not limiting, having been presented by way of example only. It will be apparent to those of skill in the appertaining arts that various modifications can be made within the scope of the above invention. Accordingly, this invention is not to be considered limited to the specific examples chosen for purposes of disclosure, but rather to cover all changes and modifications, which do not constitute departures from the permissible scope of the present invention. The invention is therefore not limited by the description contained herein or by the drawings, but only by the claims.

We claim:

1. A computer-implemented method for context based searching of category-wise-arranged electronic catalog database, comprising the steps of:

a user entering a query with one or more keyword terms to search the database, retrieving top-most-relevant categories corresponding to the user query as a search result from the database, calculating and displaying a confidence value graphically for each of the retrieved categories, said confidence value being an indication of the relevance of that category, showing the percentage impact of each of the query terms on the search result in a graphical format, and showing ranked catalog records of each of these above relevant categories.

2. The method for context based searching of category-wise-arranged electronic catalog database of claim 1, further comprising the steps of:
clubbing multiple similar catalog records into a single catalog entry for the user,
specifying to search for catalogs only in a particular segment or vertical of the category schema in the said database,
specifying values of certain attributes of the retrieval/search,
assigning external weightage by the user to each of the query terms,
allowing the user to initiate a new search on the result set of the previous search, and
retrieving search items by morphing and stemming the query terms and the terms present in the catalog records.

3. The method for context based searching of category-wise-arranged electronic catalog database of claim 1, wherein for retrieval of records from the database, a combination of statistical and rule based methods are used.

4. The method for context based searching of category-wise-arranged electronic catalog database of claim 1, wherein said confidence value of categories and said percentage impact of query terms is calculated statistically based on the said query terms input by the user.

5. The method for context based searching of category-wise-arranged electronic catalog database of claim 1, wherein the graphical format for displaying confidence value includes statistical graphs.

6. The method for context based searching of category-wise-arranged electronic catalog database of claim 1, wherein the graphical format for displaying the percentage impact of each of the query terms on the search result includes pie-chart.

7. The method for context based searching of category-wise-arranged electronic catalog database of claim 1, further comprising the step of suggesting the user with correct terms in case of misspellings made by user.

8. The method for context based searching of category-wise-arranged electronic catalog database of claim 1, further comprising the step to search based on synonymous words to user query.

9. The method for context based searching of category-wise-arranged electronic catalog database of claim 1, wherein the said user input is through a graphical user interface including a web based interface.

10. The method for context based searching of category-wise-arranged electronic catalog database of claim 1, wherein in the output, said categories and catalog records within categories are ranked in relevance to the user input query.

11. A system for context based searching of category-wise-arranged electronic catalog database, comprising:
means for a user for entering a query with one or more keyword terms to search the database,
means for retrieving top-most-relevant categories corresponding to the user query as a search result from the database,
means calculating and displaying a confidence value graphically for each of the retrieved categories, said confidence value being an indication of the relevance of that category,
means for showing a percentage impact of each of the query terms on the search result in a graphical format, and means for showing ranked catalog records of each of these above relevant categories.

12. The system for context based searching of category-wise-arranged electronic catalog database of claim 11 further comprising:
means to club multiple similar catalog records into a single catalog entry for the user,
means to specify to search for catalogs only in a particular segment or vertical of a category schema of said database,
means to specify values of certain attributes of the retrieval/search,
means to assign external weightage by the user to each of the query terms,
means for allowing the user to initiate a new search on the result set of the previous search, and
means to retrieve search items by morphing and stemming the query terms and the terms present in the catalog records.

13. The system for context based searching of category-wise-arranged electronic catalog database of claim 11, wherein means for retrieval of records from the database, are combined statistical and rule based means.

14. The system for context based searching of category-wise-arranged electronic catalog database of claim 11, wherein said confidence value of categories and said percentage impact of query terms is calculated by statistical means based on the said query terms input by the user.

15. The system for context based searching of category-wise-arranged electronic catalog database of claim 11, further comprising means to suggest the user with correct terms in case of misspellings made by user.

16. The system for context based searching of category-wise-arranged electronic catalog database of claim 11, further comprising means to search based on synonymous words to user query.

17. The system for context based searching of category-wise-arranged electronic catalog database of claim 11, wherein graphical user interface means including a web based interface are used to input data.

18. The system for context based searching of category-wise-arranged electronic catalog database of claim 11, comprising means to rank the output categories and catalog records from within the categories.

19. A computer program product comprising computer readable program code stored on a computer readable storage medium embodied therein for context based searching of category-wise-arranged electronic catalog database, comprising:
computer readable program code means configured for a user for entering a query with one or more keyword terms to search the database,
computer readable program code means configured for retrieving top-most-relevant categories corresponding to the user query as search result from the database,
computer readable program code means configured for calculating and displaying a confidence value graphically for each of the retrieved categories, said confidence value being an indication of the relevance of that category,
computer readable program code means configured for showing a percentage impact of each or the query terms on the search result in a graphical format, and
computer readable program code means configured for showing ranked catalog records of each of these above relevant categories.

20. The computer program product as claimed in claim 19, further comprising:
   computer readable program code means configured to club multiple similar catalog records into a single catalog entry for the user,
   computer readable program code means configured for specifying to search for catalogs only in a particular segment or vertical of a category schema in said database,
   computer readable program code means configured to specify values of certain attributes of the retrieval/search,
   computer readable program code means configured to assign external weightage by the user to each of the query terms,
   computer readable program code means configured for allowing the user to initiate a new search on the result set of the previous search, and
   computer readable program code means configured to retrieve search items by morphing and stemming the query terms and the terms present in the catalog records.

21. The computer program product of claim 19, further comprising computer readable program code means configured for retrieval of records from the database, by using a combination of statistical and rule based methods.

22. The computer program product as claimed in claim 19 including computer readable program code means configured for calculating confidence value of categories and said percentage impact of query based on the said query terms input by the user.

23. The computer program product of claim 19, wherein said confidence value is displayed in a graphical format that includes statistical graphs.

24. The computer program product of claim 19 wherein said percentage impact of each of the query terms on the search result is displayed in a graphical format.

25. The computer program product of claim 19, further comprising computer readable program code means configured to suggest the user with correct terms in case of misspellings made by user.

26. The computer program product of claim 19 including computer readable program code means configured to search based on synonymous words to user query.

27. The computer program product of claim 19 including computer readable program code means configured to use a graphical user interface including a web based interface for taking the user input.

28. The computer program product of claim 19 further comprising computer readable program code means configured for ranking said categories and said catalog records within the categories in relevance to the user input query.

* * * * *